July 30, 1929. J. J. GILLMAN Re. 17,389

WINDOW CONSTRUCTION

Original Filed July 21, 1924 3 Sheets-Sheet 1

Inventor
John J. Gillman
By Livingston + Van Antwerp
Attorneys

July 30, 1929. J. J. GILLMAN Re. 17,389

WINDOW CONSTRUCTION

Original Filed July 21, 1924 3 Sheets-Sheet 2

Inventor
John J. Gillman
By Livingance & Van Antwerp
Attorneys

July 30, 1929. J. J. GILLMAN Re. 17,389

WINDOW CONSTRUCTION

Original Filed July 21, 1924 3 Sheets-Sheet 3

Inventor
John J. Gillman
By Livingance & Van Antwerp
Attorneys

Reissued July 30, 1929. Re. 17,389

UNITED STATES PATENT OFFICE.

JOHN J. GILLMAN, OF CHICAGO, ILLINOIS, ASSIGNOR TO VENTO STEEL SASH COMPANY, OF MUSKEGON HEIGHTS, MICHIGAN, A CORPORATION OF MICHIGAN.

WINDOW CONSTRUCTION.

Original No. 1,628,879, dated May 17, 1927, Serial No. 727,115, filed July 21, 1924. Application for reissue filed May 13, 1929. Serial No. 362,820.

This invention relates to a window construction, designed to be made entirely of steel and in the frame of which either glass or screen panels may be detachably mounted so as to be interchangeable for different seasons of the year. My invention comprises many novel constructive details and arrangements of parts whereby the glass or screen holding frame of the window may be located and held in closed position in the metal casing for the frame, tilted back and held at an angle to said casing, or swung inwardly at the bottom and then upwardly to make a full opening to the casing. These features, as well as many others not at this time specifically stated will appear as understanding of the invention is had from the following description, taken in connection with the accompanying drawings, in which, Fig. 1 is a perspective view of the window tilted back with respect to its casing.

Like reference characters refer to like parts in the different figures of the drawings.

Figure 1:
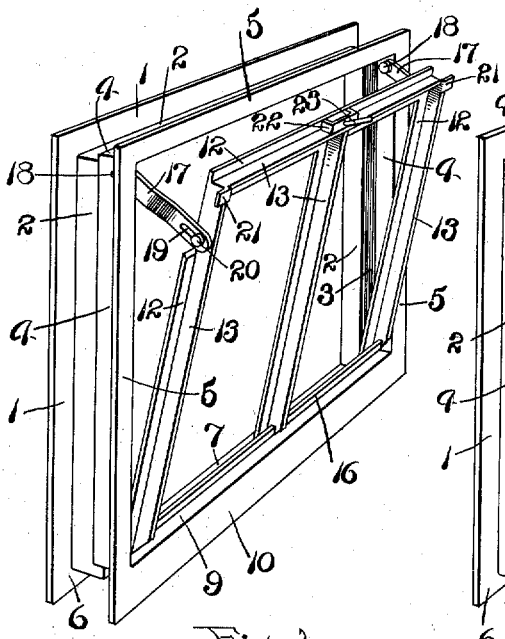

In the construction of the window, a window casing is made from sheet metal. This casing is of rectangular form and includes an upper horizontal side and two vertical sides of identical form, and comprising an outer vertical flange 1 from the inner edges of which the metal is bent at right angles for a short distance, as indicated at 2, then again bent outwardly at right angles for a short distance to make the parts 3 which parallel the flange 1, then again bent at right angles in a plane parallel to the parts 2, thereby forming the section or part 4 which at its rear edge is bent again at right angles making an inner flange 5 shorter than the flange 1 but in parallel relation thereto. The casing is completed by a horizontal lower side also of sheet metal and comprising an outer flange 6 lying in the same plane as the flanges 1 on the upper and vertical sides, from the upper edge of which the metal is turned inwardly making the horizontal section 7 below and parallel to the upper side section 2 but extending farther inward than said section 2. At the rear edge of said section 7 the metal is again bent at right angles, making the vertical section 8, it being bent at the upper edge inwardly to the rear to make the horizontal section 9 located directly below the upper side section 4 but shorter in length than said section 4, the lower side then being completed by a downturned vertical flange 10 paralleling the front flange 6 but of greater width. It will be noted that the vertical section 8 at its ends lies back and is spaced a short distance from the parts 3 of the vertical sides, thereby providing recesses 11 for a purpose which will later appear.

As a very convenient and practical manner of constructing this window casing, the upper and vertical sides are made from two commercial forms of iron readily obtained as stock production. That is, the flange 1 and the part 2 bent therefrom make an angle iron form, while the parts 3, 4 and 5 make a stock Z-bar form readily obtainable, the connection between the edges of the flanges 2 and 3 being by welding, preferably. Similarly, the parts 9 and 10 make an angle iron identical with that made by the parts 1 and 2, and the parts 6, 7 and 8 make a Z-bar identical with the Z-bar made by the parts 3, 4 and 5, so that no special forms of iron have to be produced, and only the two classes of stock are required for the window casing material. The lower side of the casing, it will be noted is identical with the upper side except for the reversal of position. At the different corners of the casing, permanent securing of the horizontal and vertical sides is made by welding.

In the casing thus made, the frame for holding glass or screen is adapted to be mounted. The upper horizontal side and the vertical sides of the frame are made from T-bar forms of iron with flanges 12 at the front from which the web 13 extends inwardly to the rear. The lower horizontal side of the frame is made from a length of Z-bar with the flange 14 thereof in the same plane with the flanges 12, the web 15 being bent to the rear from the upper edge of flange 14, and the other flange 16 projecting vertically from the rear edge of the web. A vertical partition may be located between the upper and the lower sides of the frame, formed from the same T-bar forms as used for the vertical sides and the upper side of the frame. This divides the frame into panels in which proper sizes of glass or of screen may be placed, the lower edges of said screen or glass being placed on the web 15 in front of the flange 16 and the upper and vertical edges of the glass or screen coming against the rear sides of the flanges 12. The detachable means for securing the glass or screen panes or panels in place is that used by Fay A. Yeager, as disclosed in his application for patent, Ser. No. 543,606, filed March 14, 1922, and as it forms no new feature in the present application is not shown.

Figure 2:
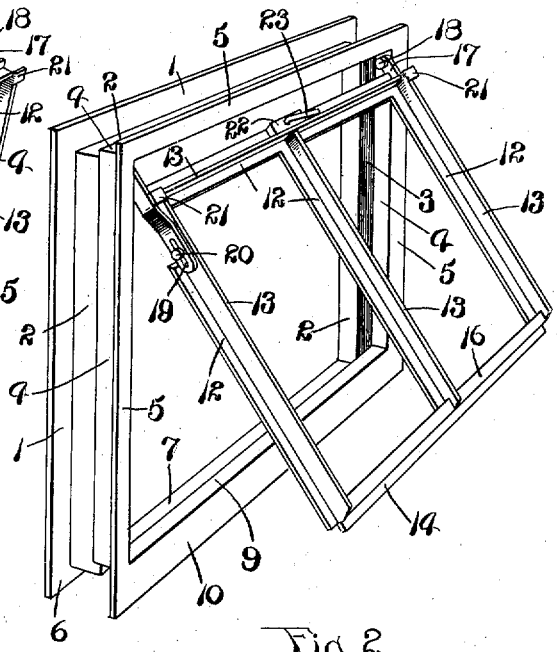
Fig. 2 is a perspective view of the window swung inward at the bottom from the casing.
Figure 3:
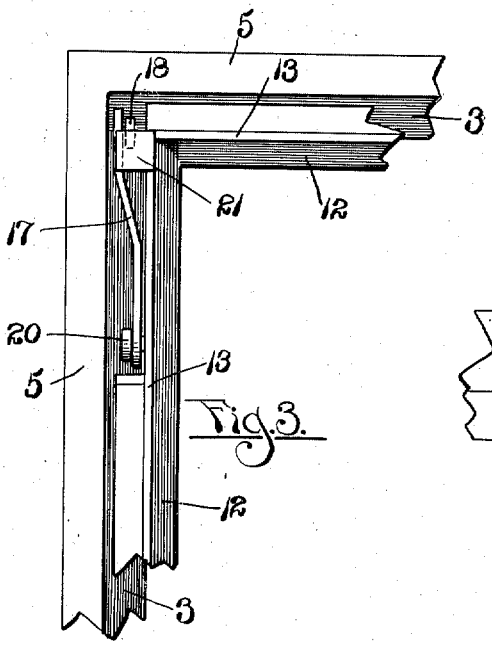
Fig. 3 is a fragmentary inside elevation of the window at an upper corner thereof.
Figure 4:
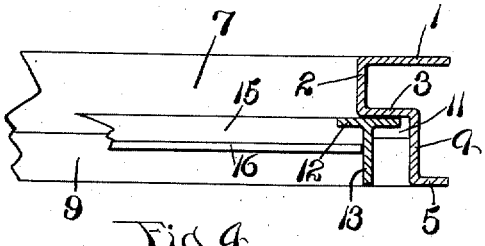
Fig. 4 is a fragmentary horizontal section through one side of the window construction.

At the upper ends of the vertical sides of the frame, the flanges 12 are cut away, as shown in Figs. 1, 2 and 3. A link bar 17 is pivotally mounted at 18 at its upper end near the upper end and to each vertical side of the casing. Each bar 17 is formed with a longitudinal slot 19 near its lower end, through which a headed pin 20 passes into each vertical side of the glass or screen holding frame.

Two ears 21, one at each side and at the upper end of the frame are welded or otherwise permanently connected to said vertical sides, the same extending laterally over the links 17. A block 22 is secured to the upper side of the frame substantially midway between its ends through which a rod is passed and rotatably mounted, at its rear end being turned at right angles to make a handle 23 and at its front end provided with a latching finger 24 which is adapted to pass through an opening 25 in the part 4 of the upper side of the casing, serving to hold the window in closed position.

Figures 5, 6, 7:
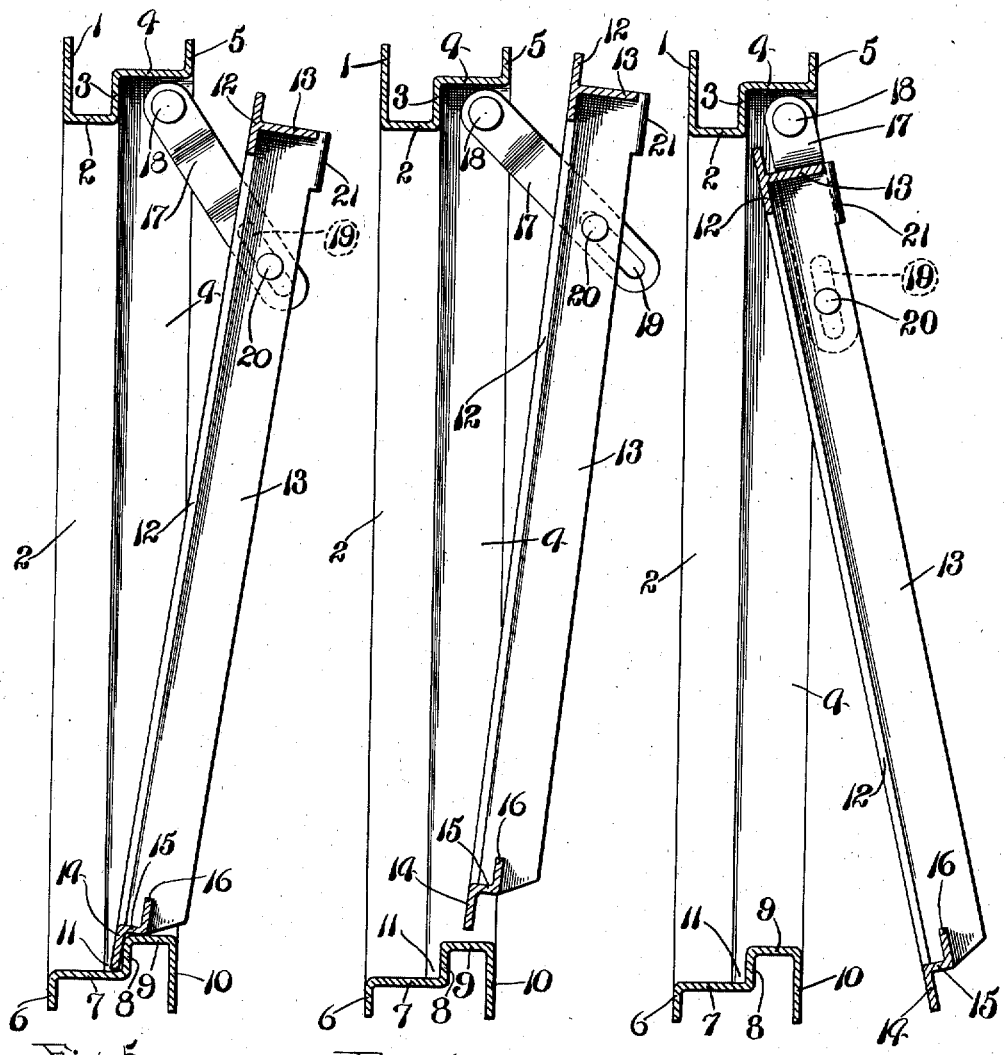
Fig. 5 is an enlarged vertical section through the window with the window frame partially tilted inward.
Fig. 6 is a like view showing the window frame lifted a short distance to disengage its lower edge from the casing preparatory to swinging the same inward at its lower portion.
Fig. 7 is a like view with the window starting on its inward swing at its lower portion.
Figure 8:
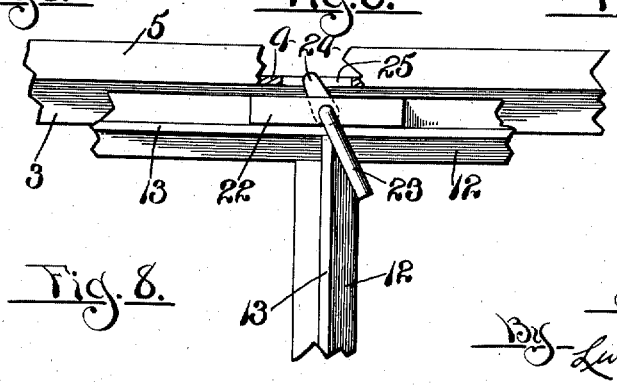
Fig. 8 is a fragmentary inside elevation of the window at the middle upper portion thereof, parts being broken away and shown in section and illustrating the locking means used to hold the window frame in closed position.

The window frame with its glass or screen mountings therein is adapted to occupy any one of three positions. It may be placed in closed position and held therein by the latch finger 24. It may be tilted, as shown in Fig. 1, the latching means first being moved to disengage the finger 24 from the opening 25 and then the upper portion of the frame moved backward until movement is stopped by pins 20 engaging the ends of the slots 19. To place the frame in the third position, it is first unlatched and its upper end partly moved back, as in Fig. 5, then the frame is lifted free of the casing, as shown in Fig. 6, and then the lower end of the frame is swung outward, as in Figs. 2 and 7. The first part of the movement is by turning the frame about the pins 20 as pivots until the ears 21 come against links 17, after which the frame and links turn about the pins 18. The frame may be swung to desired position and held therein by the usual overhead hook used in basement hinged windows, this being well known as requiring no disclosure.

Figure 9:
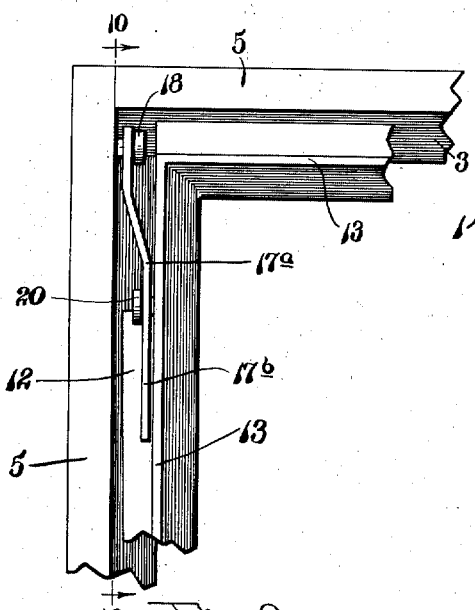
Fig. 9 is a fragmentary elevation of one corner of the window in closed position showing a modified form of link bar.
Figure 10:
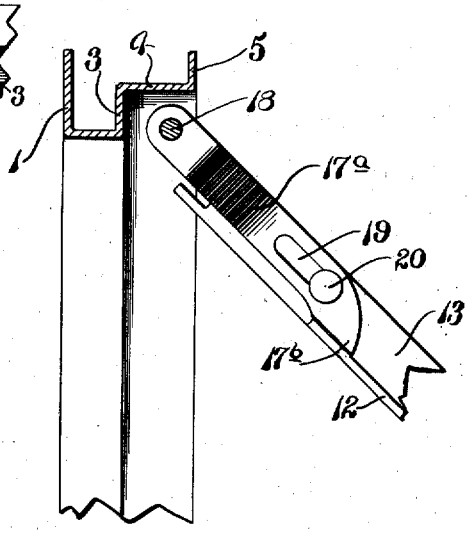
Fig. 10 is a transverse section of the same on the line 10—10 of Fig. 9.

The modified link bar $17^a$ shown in Figs. 9 and 10 obviates the necessity of the ears 21 to limit the movement of the link relative to the frame in one direction. The link $17^a$ has an extension $17^b$ beyond the slot 19 which engages the flange 12 of the frame and retains the link parallel with the side member of the frame during the operation of swinging the window inward at the bottom.

Figure 11:
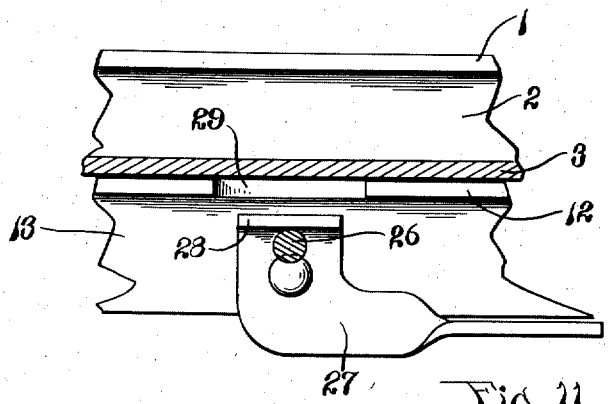
Fig. 11 is a fragmentary plan, partially in section, of parts of the window showing a modified form of lock construction.
Figure 12:
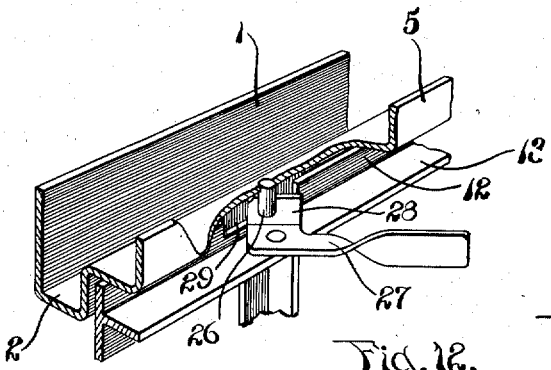
Fig. 12 is a fragmentary perspective view of the same showing the window partially closed and the lock partly turned.

The modified lock shown in Figs. 11 and 12 comprises a pin 26 extending downward from the part 4 of the casing and a lever 27 is pivoted to the top member 13 of the frame and has an upwardly extending lip 28 which swings around the pin 26 as the lever is turned to catch behind the pin and hold the window closed. A notch 29 is cut in the flange 12 to permit it to pass the pin 26.

One great advantage of this structure is the arrangement of the flange 14 which lies outside of the part 8 to drain the water outside and also the glass, when in place overlaps the flange 16 for a like purpose. When the window is closed or open at the top for ventilation, water deposited by rain or snow will run off and over the outer surfaces and can not possibly leak inside the building.

The casing or the sash may be built of wood or other material in place of the metal structure shown and described. The operation of the combined top ventilating and top hinge feature is operative equally well with either structure.

The construction described is particularly simple and practical. Its manufacture is easy. The three positions possible for the window frame, either closed, partly open or fully open, and the constructions permitting such latitude of position are features of the invention of great merit. The appended claims define the invention and all forms of structure coming within their scope are to be considered as comprehended by my invention.

I claim:

1. In a window construction, an open casing, a frame constructed for the placing of glass or screen therein and adapted to lie in said casing, links connected pivotally to the upper ends of the opposed vertical sides of the casing and having slotted lower end portions, headed pins passing through the slots into the vertical sides of the frame a short distance below the upper ends, detachable and pivotal interengaging means integrally formed on the lower members of the frame and casing, and a laterally turned ear at the upper end of each of the vertical sides of the frame to extend over said links, substantially as and for the purposes described.

2. In a window construction, an open casing of metal having a lower rail formed at one side with a vertical section connected with which is a horizontal ledge, a window frame adapted to be received within said casing, said window frame having a lower rail of angle formation having a vertical flange adapted to lie alongside of said vertical section of the lower rail of the casing, and a horizontal flange adapted to bear upon said horizontal ledge of the lower rail of the casing whereby the frame may be tilted on said ledge or bodily lifted so that its vertical flange will pass above and clear said ledge, and means for securing the frame in closed position in the casing.

3. A construction containing the elements in combination defined in claim 2, combined with means connecting the upper end portions of the side of the frame with the upper end portions of the side of the casing and for holding the frame a limited distance away from the casing at its upper portion, said means also having pivotal connection to both the casing and frame whereby the frame when lifted upwardly and disengaged from the lower rail of the casing may be swung outwardly and upwardly through an arc of substantially ninety degrees.

4. In a window construction, an open window casing formed of metal, its upper horizontal side and the vertical sides thereby being formed from an angle iron and a Z-bar joined together, and the lower horizontal side being similarly formed and inverted in position whereby a frame receiving recess is made at the inner portion of the casing with an upwardly projecting ledge on the lower horizontal side extending into said recess, a window frame having upper and lower sides and vertical sides, the lower side being formed of a Z-bar with a downwardly extending flange to pass in front of said ledge with the web of the bar adapted to rest on the ledge, the ends of the Z-bar being held from forward movement by the vertical sides of the casing, links pivotally connected at one end to the vertical sides of the casing adjacent the upper ends thereof, said links being longitudinally slotted at their opposite ends, and headed pins passing through the slots in the links and connecting with the sides of the frame adjacent their upper ends.

5. A construction containing the elements in combination defined in claim 4, combined with means projecting laterally from adjacent the upper ends of the vertical sides of the frame over the edges of said links.

6. A window frame having upper and lower sides and vertical sides, the lower side being formed from a Z-bar, and the other sides from T-bars, the flanges of the T-bars and one of the flanges of the Z-bar lying in the same plane, with the web of the Z-bar turned back at right angles and the other flange of said Z-bar lying back of and in a plane parallel to the flanges of the T-bars, whereby glass panes or screen panels may be received at their lower edges in front of the last mentioned flange of the Z-bar and back of the flanges of said T-bars.

7. In a window construction, an open rectangular casing, an open rectangular frame adapted to be received within said casing, means for detachably and tiltably mounting the lower side of the frame on the lower side of the casing, means on the casing engaged by means on the frame for stopping forward movement of the frame beyond a predetermined position in which position the window is closed, and means at the upper side of the frame adapted to be manually operated to engage with the upper side of the casing and hold the frame in closed position.

8. In a window construction, an open rectangular window casing of metal having a lower bar formed at its outer side with an upstanding channel portion, a rectangular window frame adapted to be received in said casing and having a lower side formed with a downwardly extending flange adapted to pass back of said channel portion of the lower bar of the casing, means connecting the upper portion of the frame to the casing and foldable into position alongside the frame when the frame is in closed position and extending between the casing and frame when the upper portion of the frame is tilted away from the casing, said means acting to limit the extent of tilting movement of the frame and also acting to connect the upper portion of the frame to the casing when the lower side of the frame is disconnected from the casing and the frame is swung outward, and means on the frame adapted to engage with said first mentioned means when the frame is swung away from the casing after disconnection thereof at the lower side and to hold said frame and the first mentioned means in the same plane on further swinging movement of the frame.

9. In a window construction, an open casing, a frame fitting into said casing, means for pivotally and detachably mounting the lower edge of the frame on the casing and means at the upper edge of the structure associated with the frame and casing to permit swinging of the upper edge of the frame on its pivotal mounting at its lower edge and for limiting such swinging movement of the upper edge of the frame, said means also permitting detachment of the lower edge of the frame from the casing and serving as a pivotal connection between the upper edge of the frame and casing whereby the lower edge of the frame may be swung when disconnected from the casing.

10. In a window construction, an open casing, a frame fitting into said casing, means for detachably and pivotally mounting the lower edge of the frame on the casing, a link at the upper end of the structure pivotally connected at spaced apart points respectively to said frame and casing and slidable at one of said pivotal connections and means for limiting the pivotal movement of the frame relative to the link in one direction.

11. In a window construction, an open casing, a frame fitting into said casing, means for detachably and pivotally mounting the lower edge of the frame on the casing, a link at the upper end of the structure pivotally connected at spaced apart points respectively to said frame and casing and slidable at one of said pivotal connections, means for limiting such sliding movement and means for limiting the pivotal movement of the frame relative to the link in one direction.

12. In a window construction, an open casing, a frame fitting into said casing, means for pivotally and detachably mounting the lower edge of the frame on the casing, a link at the upper end of the structure pivotally connected near one of its ends to said casing and pivotally and slidably connected near its other end to said frame, means for limiting the sliding movement of the frame relative to the link, and means for limiting the pivotal movement of the frame relative to the link in one direction.

13. In a window construction, an open casing, a frame fitting into said casing, means for pivotally and detachably mounting the lower edge of the frame on the casing, a link at the upper end of the structure pivotally connected near one of its ends to said casing and pivotally and slidably connected near its other end to said frame, and means for limiting the pivotal movement of the frame relative to the link in one direction.

14. In a window construction, an open casing, a frame fitting into said casing, means for pivotally and detachably mounting the lower edge of the frame on the casing, means connecting the upper edge portion of the frame with the upper edge portion of the casing and for holding the frame a limited distance away from the casing at its upper portion, said means also having pivotal connection to both the frame and casing whereby the lower edge of the frame may be swung away from the casing when disconnected therefrom.

15. In a window construction, an open casing, a frame fitting into said casing, means for pivotally mounting the lower edge of the frame on the casing, said means permitting disconnection by raising the frame from the casing, means at the upper part of the structure to limit the swinging of the upper edge of the frame, said means permitting raising the frame and disconnection of its lower edge from the casing and said means serving as a pivotal connection between the upper edge of the frame and casing when the lower edge of the frame is disconnected.

16. In a window construction, an open casing, a frame fitting into said casing, means for pivotally and detachably mounting the lower edge of the frame on the casing, a link pivotally connected at its respective ends to the frame and casing, and means for limiting the pivotal movement of the frame relative to the link in one direction.

17. In a window construction, an open casing, a frame fitting into said casing, means for pivotally and detachably mounting the lower edge of the frame on the casing, a link at the upper end of the structure pivotally connected near its respective ends to said frame and casing and a projection on said frame engageable with said link to limit the relative pivotal movement in one direction.

18. In a window construction, an open casing, a frame fitting into said casing, means for pivotally mounting the lower edge of said frame on the casing, said means permitting detachment of the frame from the casing by raising said frame, means for preventing raising of the frame when in closed position and manually operable means associated with said frame and casing for holding the frame in closed position.

19. In a window construction, an open casing, a frame fitting into said casing, means for pivotally mounting the lower edge of said frame on the casing, said means permitting detachment of the frame from the casing by raising said frame, means on said casing extending over said frame when in closed position to prevent raising of the frame and manually operable means to hold the frame in closed position.

In testimony whereof I affix my signature.

JOHN J. GILLMAN.